United States Patent
Chen et al.

(10) Patent No.: US 7,220,360 B2
(45) Date of Patent: May 22, 2007

(54) INTEGRATED TECHNOLOGY IN SEQUENTIAL TREATMENT OF ORGANICS AND HEAVY METAL IONS WASTEWATER

(75) Inventors: Hung-Ta Chen, Changhua Hsien (TW); Min-Shing Tsai, Tainan (TW); Juu-En Chang, Tainan (TW); Tsair-Fuh Lin, Tainan (TW); Ting-Che Hsiao, Tainan (TW); Jun-Yi Wu, Tainan (TW); You-Shen Chen, Tainan Hsien (TW)

(73) Assignee: National Cheng Kung University, Tainan (TW)

( * ) Notice: Subject to any disclaimer, the term of this patent is extended or adjusted under 35 U.S.C. 154(b) by 275 days.

(21) Appl. No.: 10/865,784

(22) Filed: Jun. 14, 2004

(65) Prior Publication Data

US 2005/0274678 A1    Dec. 15, 2005

(51) Int. Cl.
*C02F 1/62*    (2006.01)
(52) U.S. Cl. .............. 210/709; 210/695; 210/712; 210/721; 210/724; 210/726; 210/912; 423/633
(58) Field of Classification Search ............... 210/709
See application file for complete search history.

(56) References Cited

U.S. PATENT DOCUMENTS

| | | | | |
|---|---|---|---|---|
| 3,931,007 A | * | 1/1976 | Sugano et al. | 210/717 |
| 4,724,084 A | * | 2/1988 | Pahmeier et al. | 210/709 |
| 5,505,857 A | * | 4/1996 | Misra et al. | 210/709 |
| 5,685,993 A | * | 11/1997 | Liu | 210/695 |
| 6,238,571 B1 | * | 5/2001 | Olmez et al. | 210/722 |

* cited by examiner

Primary Examiner—Peter A. Hruskoci

(57) ABSTRACT

This invention offers an integrated technology in sequential treatment of wastewater. Low biodegradable organics and heavy metal ions are both contained in wastewater from surface finishing processes. The aim of the invention is to find the solution for treatment of organics and heavy metal ions in complicated wastewater that contains organics and heavy metal ions sequentially. Low biodegradable organics are oxidized by a fenton process with pH ranging from 2 to 5 and temperature ranging from 20° C. to 100° C. Heavy metal ions are then treated by a ferrite process with pH ranging from 8 to 12 and temperature ranging from 20° C. to 100° C. The integrated technology of the fenton process and the ferrite process (2FP) is advantageous to treat the wastewater from surface finishing processes, decrease the production of iron sludge caused in the fenton process and increase the quality of ferrite products.

3 Claims, 6 Drawing Sheets

INTEGRATED TECHNOLOGY IN SEQUENTIAL TREATMENT OF ORGANICS AND HEAVY METAL IONS WASTEWATER

BACKGROUND OF THE INVENTION

1. Field of the Invention

This invention relates to an integrated technology in sequential treatment of organics and heavy metal ions wastewater, particularly to one capable of firstly using a fenton process to remove organics from wastewater, and sequentially using a ferrite process to remove multiple heavy metal ions from the wastewater in order to increase the quality of ferrite products obtained therefrom. By controlling pH, temperature and ferrous salt, Fe ions taken as catalysts in the fenton process under acidic conditions are turned into reactants in the ferrite process under alkaline conditions, thereby reducing the amount of iron sludge caused in the fenton process, decreasing a reaction time of the ferrite process, increasing the quality of ferrite products obtained therefrom for recycling, and enhancing an efficiency in solid/liquid separation.

2. Description of the Prior Art

Although some conventional treatment processes can treat industrial wastewater to make the water quality met with the limitations of the environmental laws, sludge with heavy metal oxides caused by such conventional wastewater treatments becomes a serious secondary pollution needed to be solved further. For example, there is a large amount of heavy metal sludge generated per year and becoming hazardous industrial waste. Although the heavy metal sludge is currently treated by approved solidification, solidified matrix formed therefrom cause an overloading to landfills, or even become a source of soil pollution.

Since the wastewater of a surface finishing plant (e.g., electroplating wastewater) generally contains heavy metal ions and low biodegradable organics (e.g., surfactants), the current wastewater treatment can use a fenton process to treat the low biodegradable organics and a ferrite process to treat the heavy metal ions, respectively.

1. At the moment, the fenton process is generally used to treat many low biodegradable organics such as phenols, chlorophenols, chlorobenzenes, nitrophenols, nitrobenzenes, hydrocarbons, polynuclear aromatic hydrocarbons (PAHs), polychlorinated biphenyls (PCBs), polychlorinated ethylenes (PCEs), and surfactants, etc., and has an ability of treating the organics with high concentration up to 175,000 ppm. Moreover, since the fenton process is a homogeneous catalytic reaction without limitation in mass transfer, reactor tanks used in the fenton process can be easily designed in the treatment of wastewater. In addition, the fenton process also performs well in the decoloration of dyeing wastewater by lowering the absorption of the organics to ultraviolet rays in an ultraviolet/hydrogen peroxide ($UV/H_2O_2$) treatment.

However, there are disadvantages incurred in the fenton process because of some limitations, e.g., an increasing reaction time due to the insufficient Fe ions, and an iron sludge production caused by a chemical coagulation of the Fe ions, which are described as follows.

(1). Since the fenton process is performed under acidic conditions of pH in the range of 2~5, it is unsuitable for the fenton process to treat soil and sludge in alkaline and buffer environment.

(2). Traditionally, in the fenton process, a fenton's reagent, a mixture of ferrous salt and hydrogen peroxide ($H_2O_2$), is added into the wastewater. The ferrous salt including ferrous ions ($Fe^{2+}$) and ferric ions ($Fe^{3+}$) is taken as a catalyst, and more or less amount of the catalyst has a greater effect on the terminal time of the fenton process. However, since the hydrogen peroxide ($H_2O_2$) can make the ferrous ions ($Fe^{2+}$) turned into ferric ions ($Fe^{3+}$), all of the Fe ions are required to be further removed by the chemical coagulation. A large amount of iron sludge caused in the treatment of the Fe ions by the chemical coagulation also becomes an overloading of landfills. Moreover, in case of the wastewater contains heavy metal ions therein, heavy metals are liable to be dissolved from heavy metal sludge under acidic conditions to make the heavy metal sludge become a hazardous industrial waste required to be further treated by solidification, thus increasing the cost for the treatment of such hazardous industrial waste.

(3). In order to reduce the iron sludge production in the fenton process, less amount of the catalyst is applied to the wastewater, thus resulting in an extension of the reaction time for extra several hours.

Therefore, the traditional fenton process is disadvantageous because the Fe ions taken as catalysts have to be removed by the chemical coagulation, and such large amount of iron sludge caused in the removal of the Fe ions is needed to be treated further, thus increasing the reaction time and the cost of wastewater treatment.

In order to solve the problem of the iron sludge, a Fered-Fenton technology is used to oxidize and decompose the organics of the wastewater without using a large amount of the ferrous salt. However, the Fered-Fenton technology requires a longer reaction time, thus becoming uneconomical in cost.

Furthermore, a fluidized bed is used to make the Fe ions coated onto a support to reduce the iron sludge production. However, after the surface of the support being coated with the Fe ions, the support will be expanded too large to perform the function of the fluidized bed any further, thus limiting the capacity of reducing the iron sludge production.

2. The ferrite process, as a chemical precipitation of hydrometallurgy technology, is commonly used by those skilled in the art to treat heavy metal wastewater containing multiple heavy metal ions, e.g., As, Ba, Cd, Cu, Co, Cr, Fe, Mn, Hg, Mo, Ni, Pb, Sr, V, Zn, etc., and has an ability to treat such heavy metal ions with high concentration up to 20,000 ppm so that the ferrite process is also suitable to be widely utilized in the treatment of heavy metal wastewater such as laboratory wastewater, acid mining drainage, surface finishing wastewater, and stainless steel processing wastewater, etc.

However, the ferrite process requires to have sufficient amount of reactants including ferrous ions ($Fe^{2+}$) and ferric ions ($Fe^{3+}$) added into the wastewater to form ferrite products, by which the hazardous heavy metal ions are stabilized in the crystal lattices of the ferrites without worry of being leached to cause soil pollutions.

In the existing ferrite process, a proper amount of the ferrous salt is added into the wastewater to be oxidized by air for forming the ferrite products provided with high stability and capable of being passed the limitation of Toxicity Characteristic Leaching Procedure (TCLP). Moreover, the ferrite products with magnetism can be recycled as magnetic materials for further use. However, some organics contained in the wastewater have a harmful effect on the magnetism of the ferrite products, thus greatly decreasing the quality of the ferrite products to be recycled as industrial raw materials and lowering the economical incentive of encouraging the skilled in the art to recover the ferrite products for reuse due to their low quality.

Based on the aforesaid description, it is apparent that the heavy metal ions and the low biodegradable organics contained in the mixed wastewater of the surface finishing plant are unable to be simultaneously removed from the wastewater either by a fenton process or a ferrite process. Therefore, a more effective solution is required in the low cost of wastewater treatment and the high economical valve for reuse.

In the conventional wastewater treatments using ferrous ions ($Fe^{2+}$) and hydrogen peroxide ($H_2O_2$), one single fenton process is often used to treat wastewater containing low biodegradable organics; one single ferrite process is also often used to treat wastewater containing heavy metal ions. Ferric ions ($Fe^{3+}$) yielded in the fenton process cause a color problem in the wastewater, but are required for forming ferrite products in the ferrite process. In order to solve the above-mentioned problems, the present invention discloses an integrated technology of the fenton and ferrite processes in sequential treatment of organics and heavy metal ions out of the wastewater, thereby capable of treating wastewater of most surface finishing plants, decreasing treatment units and reducing the amount of iron sludge.

SUMMARY OF THE INVENTION

It is an objective of the present invention to integrate a fenton process and a ferrite process that utilize ferrous ions ($Fe^{2+}$) and hydrogen peroxide ($H_2O_2$) to sequentially treat organics and heavy metal ions contained in wastewater.

It is another objective of the present invention to reduce the effect of organics on ferrite products obtained in wastewater treatment, thereby enhancing the quality of the ferrite products.

It is a further objective of the present invention to use a ferrite process to turn Fe ions taken as catalysts in a fenton process into recyclable ferrite products in a ferrite process, thereby solving a color problem in wastewater caused by ferric ions ($Fe^{3+}$) and reducing the amount of iron sludge caused by chemical coagulation after the fenton process.

The present invention includes the following necessary techniques and characteristics in accomplishment:

1. The present invention is an integrated technology of a fenton process and a ferrite process for sequentially treating organics and multiple heavy metal ions contained in wastewater; therefore, the integrated technology of the present invention is suitable to be used in wastewater treatment of surface finishing plant.

2. The present invention is capable of decomposing organics by the fenton process to reduce the effect of the organics on the formation of ferrite products to avoid a harmful effect on the quality of the ferrite products.

3. The present invention is capable of accelerating the ferrite process by using hydrogen peroxide ($H_2O_2$) to control a molar ratio of ferric ions ($Fe^{3+}$):ferrous ions ($Fe^{2+}$).

4. Chemicals used in the fenton process and the ferrite process of the present invention are mainly ferrous sulfate ($FeSO_4 \cdot 7H_2O$) (or ferrous salt) and hydrogen peroxide ($H_2O_2$) which are harmless to environment after reaction.

The primary feature of the present invention is to provide an integrated technology in sequential treatment of organics and heavy metal ions wastewater, mainly including the steps of:

(1). initializing a fenton process by adding proper amount of ferrous salt and hydrogen peroxide ($H_2O_2$) into continuously mixing wastewater to adjust a molar ratio of organics:hydrogen peroxide ($H_2O_2$):ferrous ions ($Fe^{2+}$) in a proper molar ratio, wherein reactive environment is controlled under conditions of temperature ranging from 20° C. to 100° C. and pH ranging from 2 to 5, and wherein a mixing rate is adjusted properly, and then monitoring variance of pH and oxidation-reduction potential (ORP) during the fenton process in determining the terminal time of the fenton process as pH and ORP both reach a steady state;

(2). after stage of the fenton process, further adding proper amount of ferrous salt to re-adjust the molar ratio of organics:hydrogen peroxide ($H_2O_2$):ferrous ions ($Fe^{2+}$) to control a molar ratio of ferrous ions ($Fe^{2+}$):heavy metal ions greater than 4;

(3). further heating temperature ranging from 20° C. to 100° C., and adding proper amount of ferrous salt and alkali to adjust pH ranging from 8 to 12 for conducting a concentration for heavy metal ions;

(4). sequentially aerating air with a proper rate to initialize a ferrite process, and then monitoring variance of pH and ORP during the ferrite process in determining the terminal time of the ferrite process as pH and ORP both reach a steady state, by which ferrite products are capable of being formed therefrom; and, (5). after stage of the ferrite process, delivering slurry out of an outlet of a reactor tank and into a sedimentation tank for solid/liquid separation and filtration, by which solid sediment of the ferrite products may be further examined with a toxicity characteristic leaching procedure (TCLP), and filtrate that is separated and filtered from the slurry may be recirculated to the step (3) for reuse or directly drained away after an aqueous analysis and a pH adjustment.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
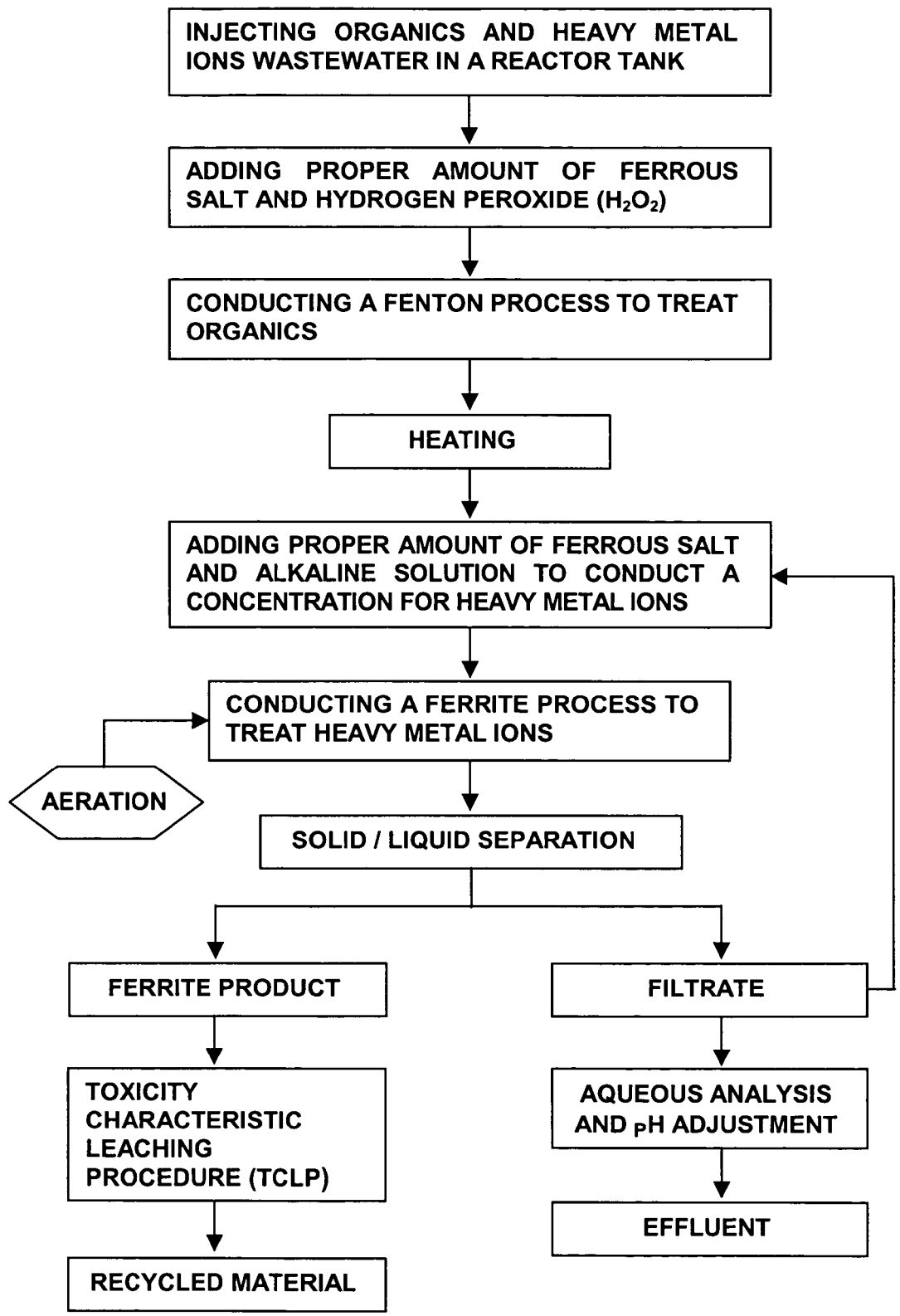
FIG. 1 is a flowchart showing processes for wastewater treatment in the present invention.
Figure 2:
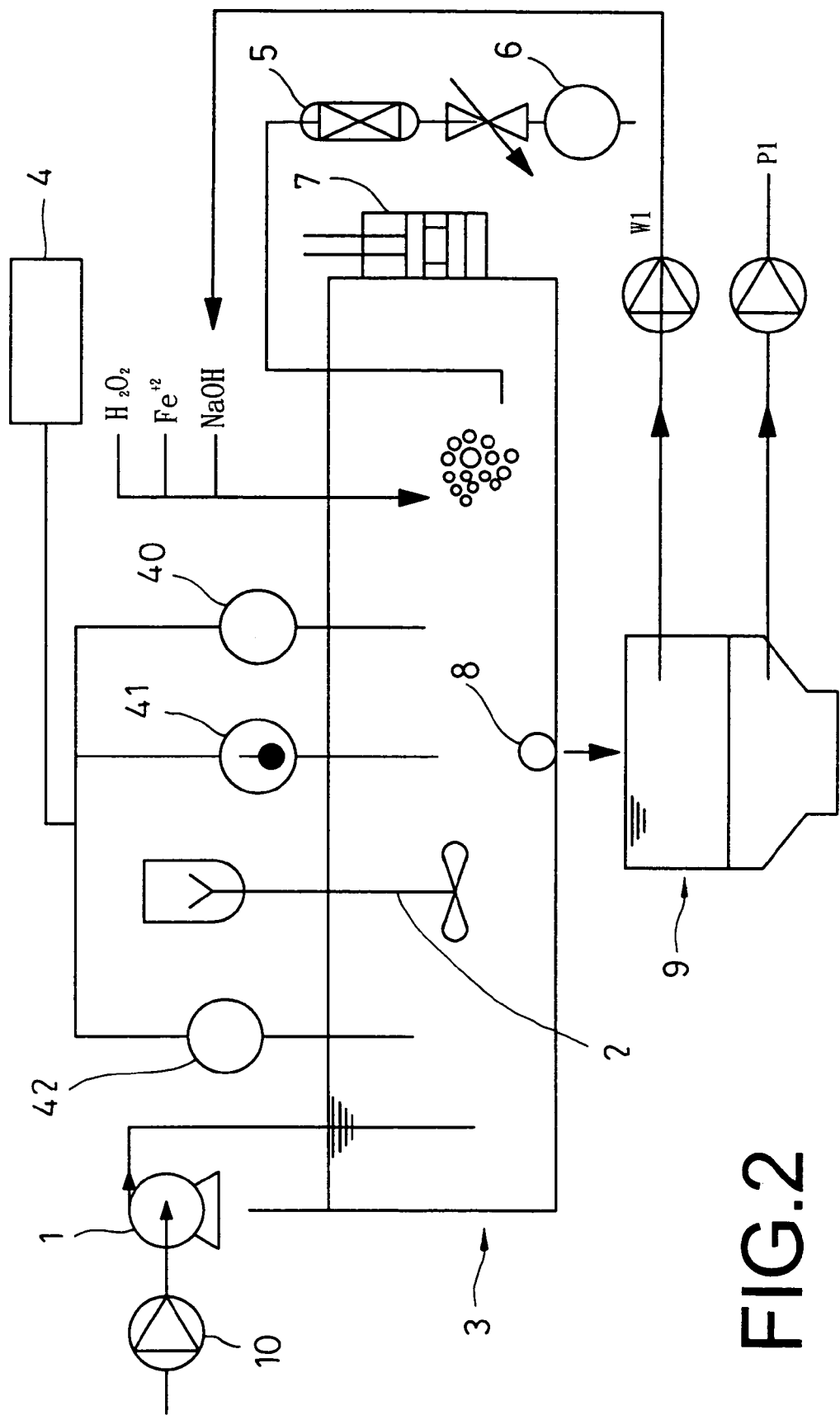
FIG. 2 is a diagram showing apparatus for wastewater treatment in the present invention.
Figure 3:
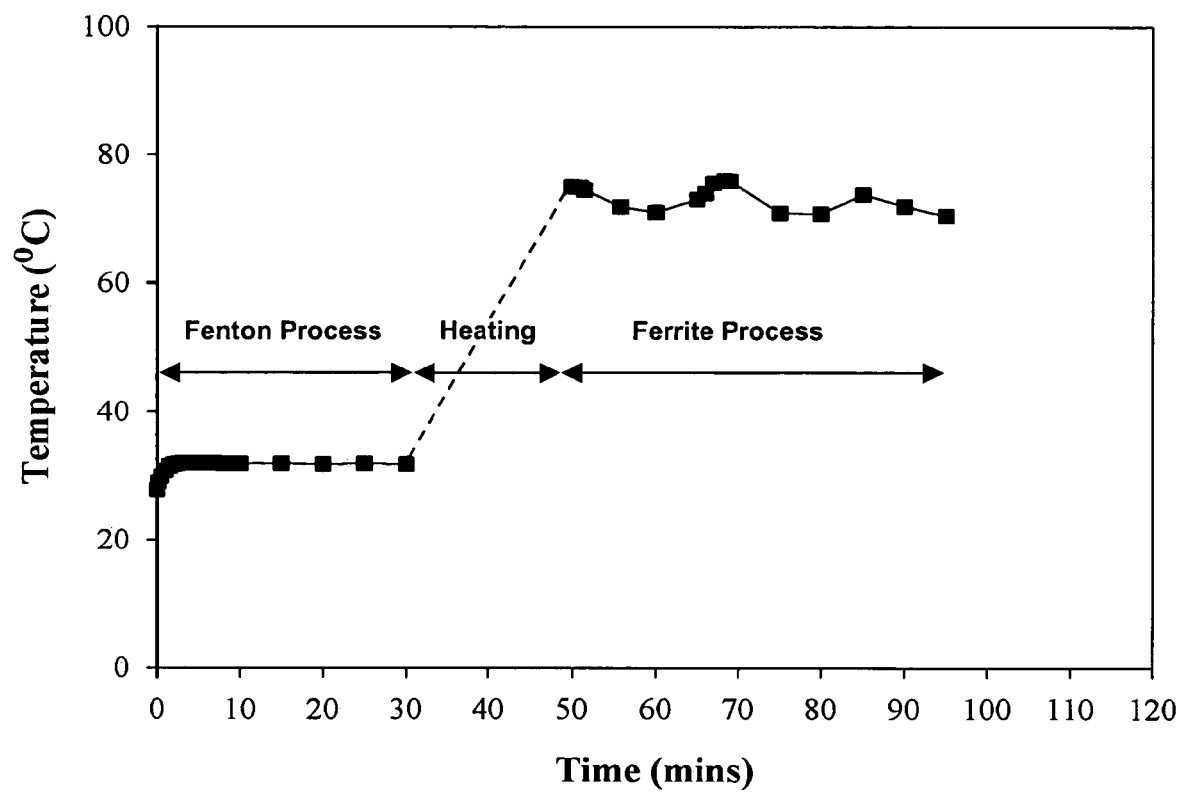
FIG. 3 is a graph showing temperature versus elapsed time at different reaction stages of a preferred embodiment of the present invention.
Figure 4:
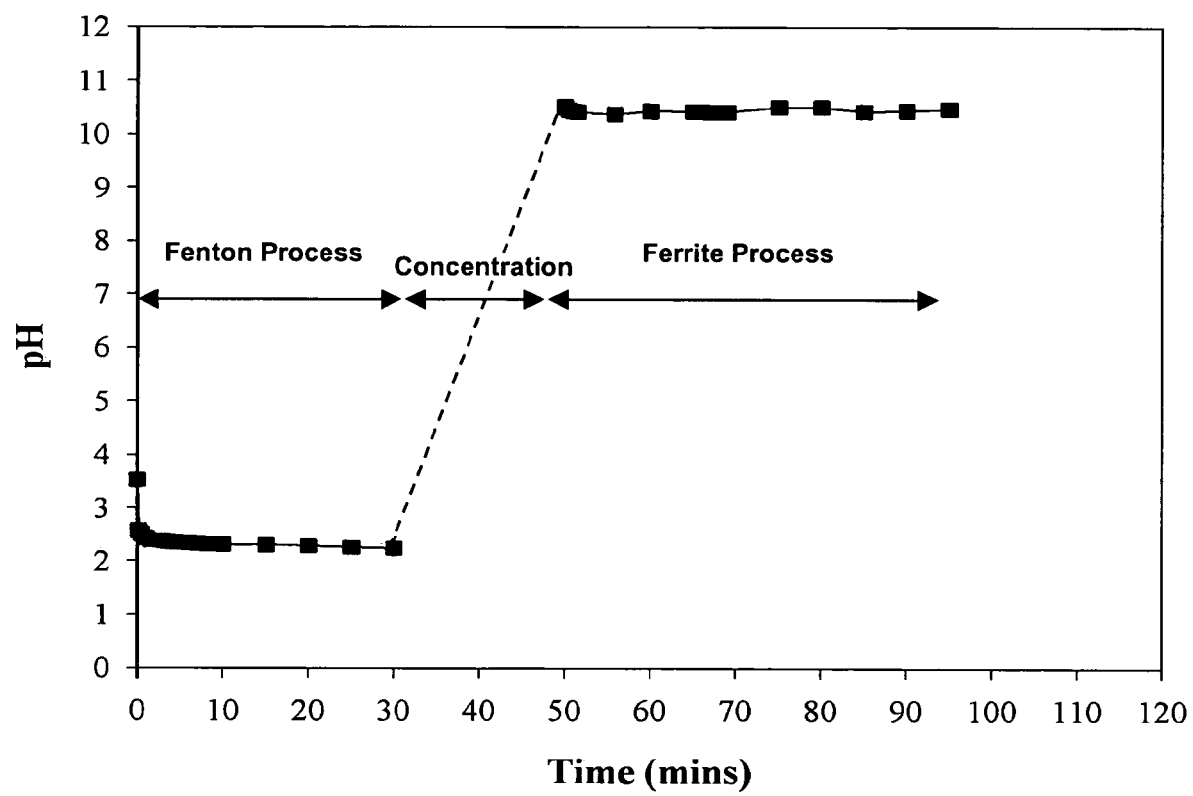
FIG. 4 is a graph showing pH versus elapsed time at the different reaction stages of the preferred embodiment of the present invention.
Figure 5:
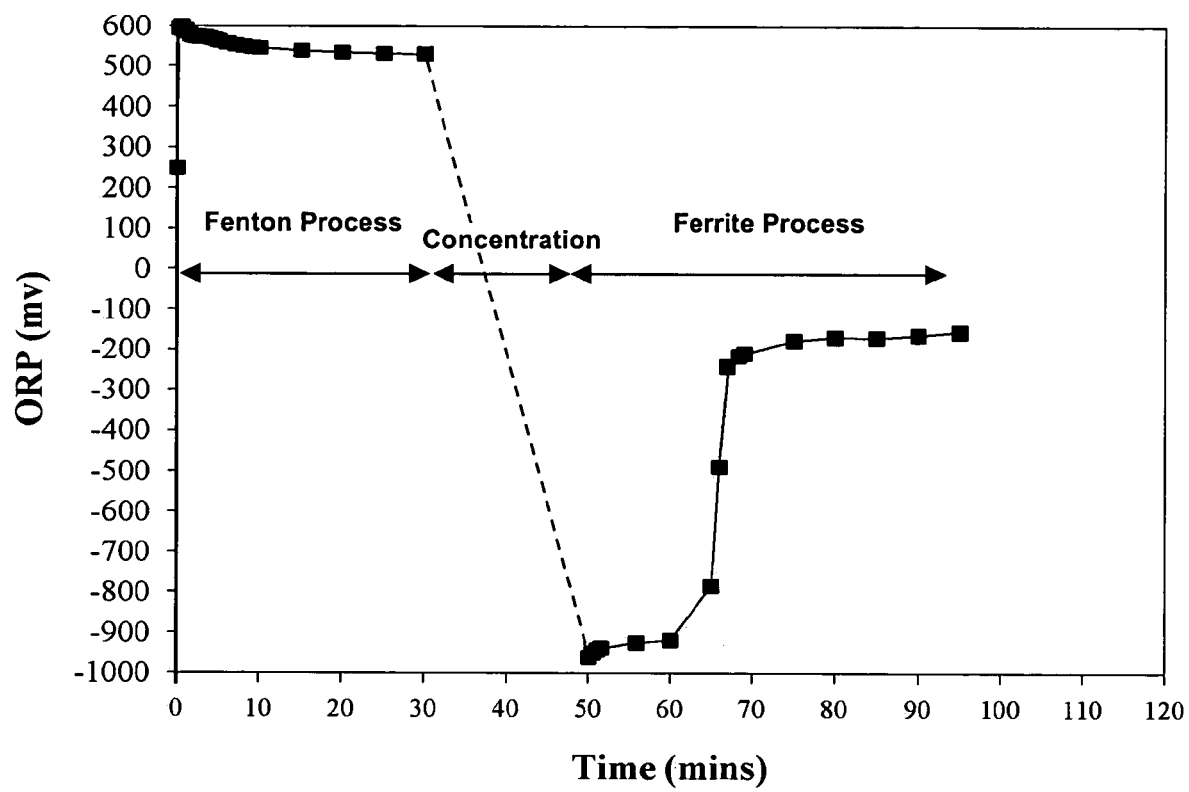
FIG. 5 is a graph showing oxidation-reduction potential (ORP) versus elapsed time at the different reaction stages of the preferred embodiment of the present invention; and, FIG. 6 is a graph showing X-ray diffraction (XRD) patterns of ferrite products obtained and analyzed in the preferred embodiment of the present invention.

The present invention utilizes one single reactor tank to sequentially treat organics and heavy metal ions contained in wastewater by adjusting a molar ratio of hydrogen peroxide ($H_2O_2$):ferrous salt to firstly treat the organics by a fenton process under conditions of pH ranging from 2 to 5 and temperature ranging from 20° C. to 100° C., and then treat the heavy metal ions by a ferrite process under conditions of pH ranging from 8 to 12 and temperature ranging from 20° C. to 100° C.

In the fenton process, ferrous ions ($Fe^{2+}$) react with hydrogen peroxide ($H_2O_2$) to yield a hydroxyl radical, by-which an organic matter (R) is oxidized by the hydroxyl radical according to the following reactions:

$$Fe^{2+}+H_2O_2 \rightarrow Fe^{3+}+\cdot OH+OH^- \quad (1)$$

$$\cdot OH+R+H_2O \rightarrow \cdot R \quad (2)$$

$$\cdot OH+R \rightarrow \cdot ROH \quad (3)$$

$$Fe^{3+}+\cdot R \rightarrow Fe^{2+}+\text{products} \quad (4)$$

$$2\cdot R \rightarrow R\cdot R \quad (5)$$

$$Fe^{2+}+\cdot R+H^+ \rightarrow Fe^{3+}+RH \quad (6)$$

In the ferrite process, sodium hydroxide (NaOH) is added into an aqueous solution containing ferrous ions ($Fe^{2+}$) and $M^{2+}$ to generate green nonmagnetic sediment of ferrous hydroxide [$Fe(OH)_2$] and $M(OH)_2$, wherein M is metal. Ferrous hydroxide [$Fe(OH)_2$] and $M(OH)_2$ will be continuously reacted to form a metal hydroxyl complex containing ferrous ions ($Fe^{2+}$) and $M^{2+}$ therein according to the following reactions:

$$M^{2+}+2OH^- \rightarrow M(OH)_2 \quad (7)$$

$$2Fe^{2+}+4OH^- \rightarrow 2Fe(OH)_2 \quad (8)$$

$$M(OH)_2+2Fe(OH)_2 \rightarrow [M(OH)]^++2[Fe(OH)]^++3OH^- \quad (9)$$

Aerating air into an aqueous solution of the metal hydroxyl complex containing ferrous ions ($Fe^{2+}$) and $M^{2+}$ therein, by which oxygen in the air may be dissolved in the solution to form dissolved oxygen ([O]) to oxidize ferrous ions ($Fe^{2+}$) into ferric ions ($Fe^{3+}$) and further react with the metal hydroxyl complex to form a ferrosic complex according to the following reaction:

[O]: dissolved oxygen

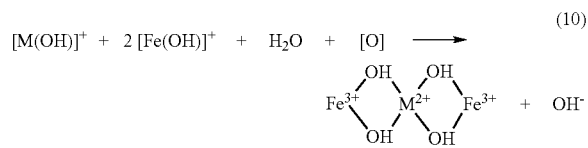

(10)

The ferrosic complex further reacts with alkali to yield ferrite products according to the following reaction:

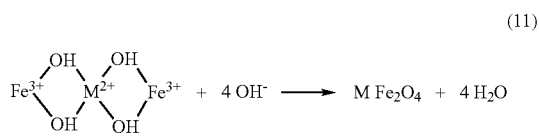

(11)

so as to obtain the following general reaction:

$$xM^{2+}+(3-x)Fe^{2+}+6OH^-+\tfrac{1}{2}O_2 \rightarrow M_xFe_{(3-x)}O_4+3H_2O \quad (12)$$

Therefore, the fenton process is firstly carried out with reactive environment under conditions of temperature ranging from 20° C. to 100° C. and pH ranging from 2 to 5 (i.e. acidic condition), by which the organics in the wastewater may be oxidized in a high efficiency of decomposition and Fe ions in the fenton process are taken as catalysts. And then, the ferrite process is sequentially carried out with reactive environment under conditions of temperature ranging from 20° C. to 100° C. and pH ranging from 8 to 12 (i.e. alkaline condition), by which the catalytic Fe ions including ferrous ions ($Fe^{2+}$) and ferric ions ($Fe^{3+}$) act as reactants to react with the heavy metal ions in the wastewater to form the ferrite products in solid phase which can be further divided by magnetic separation, thus enhancing an high efficiency in solid/liquid separation.

The present invention includes the following steps in accomplishment:

1. initializing a fenton process by adding ferrous salt and hydrogen peroxide ($H_2O_2$) into wastewater to adjust a molar ratio of organics:hydrogen peroxide ($H_2O_2$):ferrous ions ($Fe^{2+}$) to be 1:20~100:0.2~10, and controlling reactive environment under conditions of temperature ranging from 20° C. to 100° C. and pH ranging from 2 to 5, by which hydrogen peroxide ($H_2O_2$) can decompose the organics due to the catalysis of the Fe ions;

2. heating with a controlled temperature ranging from 20° C. to 100° C., and then adding proper amount of ferrous salt into the wastewater to re-adjust the concentration of ferrous ions ($Fe^{2+}$) because ferrous ions ($Fe^{2+}$) have been turned into ferric ions ($Fe^{3+}$) to control the ratio of ferric ions ($Fe^{3+}$):ferrous ions ($Fe^{2+}$) after reaction of the fenton process and further to control a molar ratio of ferrous ions ($Fe^{2+}$):heavy metal ions greater than 4 so as to make the ratio of ferric ions ($Fe^{3+}$):ferrous ions ($Fe^{2+}$) in the wastewater close to a stoichiometical value 2, which facilitates to accelerate the formation of ferrite products;

3. further adding alkaline such as sodium hydroxide (NaOH) to re-adjust the pH ranging from 8 to 12, and then aerating air to initialize a ferrite process, by which the heavy metal ions in the wastewater can be treated to form ferrite products; and, 4. continuing the ferrite process to form the ferrite products under conditions of temperature ranging from 20° C. to 100° C., pH ranging from 8 to 12 and ORP greater than −200 mv, monitoring variance of pH and ORP in determining the terminal time of the ferrite process as pH and ORP both reach a steady state, and finally filtering and separating the ferrite products and filtrate in solid/liquid separation.

A preferred embodiment according to the above-mentioned steps, referring to FIGS. 1 to 5, is depicted below as an example.

Wastewater of the surface finishing plant containing organics such as 1,2,3 benzotriazole (BTA) about 524 ppm (i.e. 0.0044 mole) and heavy metal ions such as Zn ions about 1078 ppm (i.e. 0.0165 mole) was treated with the following steps:

(1). A Fenton Process:

A fenton process was initialized by firstly injecting the wastewater (1 liter, for instance) from a wastewater tank 10 by a pump 1 into a reactor tank 3, further actuating a mixer 2 to continuously mix the wastewater having been disposed in the reactor tank 3, and then adding about 0.0176 mole ferrous sulfate ($FeSO_4 \cdot 7H_2O$) (i.e. ferrous salt) into the reactor tank 3. By the way, variance of temperature, pH and ORP were monitored on a data logger 4. The temperature was controlled by a thermometer 40 to be maintained in an appropriate status, about 30° C. preferred. After adding about 10.088 mole hydrogen peroxide ($H_2O_2$) into the reactor tank 3, pH was controlled by a pH meter 41 with reactive environment under acidic condition, about 2.5 preferred, so as to adjust a molar ratio of organics:hydrogen peroxide ($H_2O_2$):ferrous ions ($Fe^{2+}$) to be 1:20:4. The operation conditions of the fenton process are shown in Table 1.

TABLE 1

Operation Conditions of the Fenton Process

| BTA (mole) | $H_2O_2$ (mole) | Ferrous Salt (mole) | Temperature (° C.) | pH |
|---|---|---|---|---|
| 0.0044 | 0.0880 | 0.0176 | 30 ± 5 | 2.5 |

Molar ratio of organic matter (BTA):$H_2O_2$:ferrous salt = 1:20:4

Furthermore, the mixer 2 was continuously mixing the wastewater with an adjusted mixing rate, 300 rpm preferred. During the fenton process, the thermometer 40, the pH meter 41 and an oxidation-reduction potential meter (ORP meter) 42 were monitored on the data logger 4 to determine the terminal time of the fenton process as variance of pH and ORP both reach a steady state, referring to FIGS. 3 to 5. The fenton process was performed for the terminal time (about 30 minutes under the operation conditions in the preferred embodiment) to make the organics decomposed by hydrogen peroxide ($H_2O_2$) due to the catalysis of ferrous ions ($Fe^{2+}$).

(2). A Concentration for Heavy Metal Ions:

0.1144 mole ferrous sulfate ($FeSO_4 \cdot 7H_2O$) (i.e. ferrous salt) was added into the reactor tank 3 to make the amount of the ferrous sulfate ($FeSO_4 \cdot 7H_2O$) reacted in the ferrite process reach 0.132 mole to re-adjust the molar ratio of organics:hydrogen peroxide ($H_2O_2$):ferrous ions ($Fe^{2+}$) to be 1:20:30 and a molar ratio of Fe ions:Zn ions to be 8. And then, the wastewater was heated by a heater 7 for about 20 minutes to raise the temperature to 70.+−0.5.degree. C. Furthermore, sodium hydroxide (NaOH) was added into the reactor tank 3 to adjust pH ranging from 8 to 12 (11 preferred) so as to change the reactive environment under alkaline condition, by which a concentration of heavy metal ions, such as Zn ions, was performed accordingly. The operation conditions of the ferrite process are shown in Table 2.

TABLE 2

Operation Conditions of the Ferrite Process

| BTA (mole) | $H_2O_2$ (mole) | Ferrous Salt (mole) | Temperature (° C.) | pH |
|---|---|---|---|---|
| 0.0044 | 0.0880 | 0.132 | 70 ± 5 | 11 |

Molar ratio of organic matter (BTA):$H_2O_2$:ferrous salt = 1:20:30

(3). A Ferrite Process:

A ferrite process was sequentially initialized by aerating air into the reactor tank 3 with a rate at 4 L/min/L under the control of an air compressor 6 and an air-flow meter 5. During the ferrite process, the thermometer 40, the pH meter 41 and ORP meter 42 were monitored on the data logger 4 to determine the terminal time of the ferrite process as variance of pH and ORP both reach a steady state, referring to FIGS. 3 to 5. In the preferred embodiment, ferrite products were formed under the reactive conditions of temperature at 70±5° C., pH at 11 and ORP greater than −200 mv, and the time of reaching the steady state in the ferrite process was only about 18 minutes.

(4). Solid/Liquid Separation:

Solid/liquid separation was then carried out by delivering slurry that is mixed with ferrite products P1 and filtrate W1 out of an outlet 8 of the reactor tank 3 and into a sedimentation tank 9 to be deposited therein in a stationary status for separation and filtration, by which sediment of the ferrite products P1 was further performed with a toxicity characteristic leaching procedure (TCLP), and the filtrate W1 was recirculated to the step (3) for reuse or directly drained away after conducting an aqueous analysis and a pH adjustment to meet effluent standards.

According to the aforesaid description of the preferred embodiment, after the wastewater is treated by the integrated technology of the fenton and ferrite processes of the present invention, an analysis of water quality and obtained products as shown in Table 3 and an analysis of iron sludge reduction is obtained as shown in Table 4 are described as follow.

TABLE 3

Analysis of Water Quality and Products

| Analysis Item | BTA | TOC* | Zn ions |
|---|---|---|---|
| Water Quality (ppm) Original wastewater | 523.60 | 734.70 | 1078.00 |
| Water Quality (ppm) after treatment of the fenton and ferrite | 26.70 | 445.10 | 0.04 |
| Removal Efficiency (%) | 94.80 | 39.40 | 99.9 |
| TLCP of Ferrite Prodcut (ppm) | — | — | 10.94 |

*TOC = Total Organic Carbon

TABLE 4

Analysis of Iron Sludge Reduction

| Analysis Item | Fe ion concentration |
|---|---|
| Water Quality (ppm) Original wastewater | 0.00 |
| Water Quality (ppm) after treatment of the fenton process | 923.00 |
| Water Quality (ppm) after treatment of the fenton and ferrite processes | 0.07 |
| Iron Sludge Reduction (%) | 99.99 |

Figure 6:
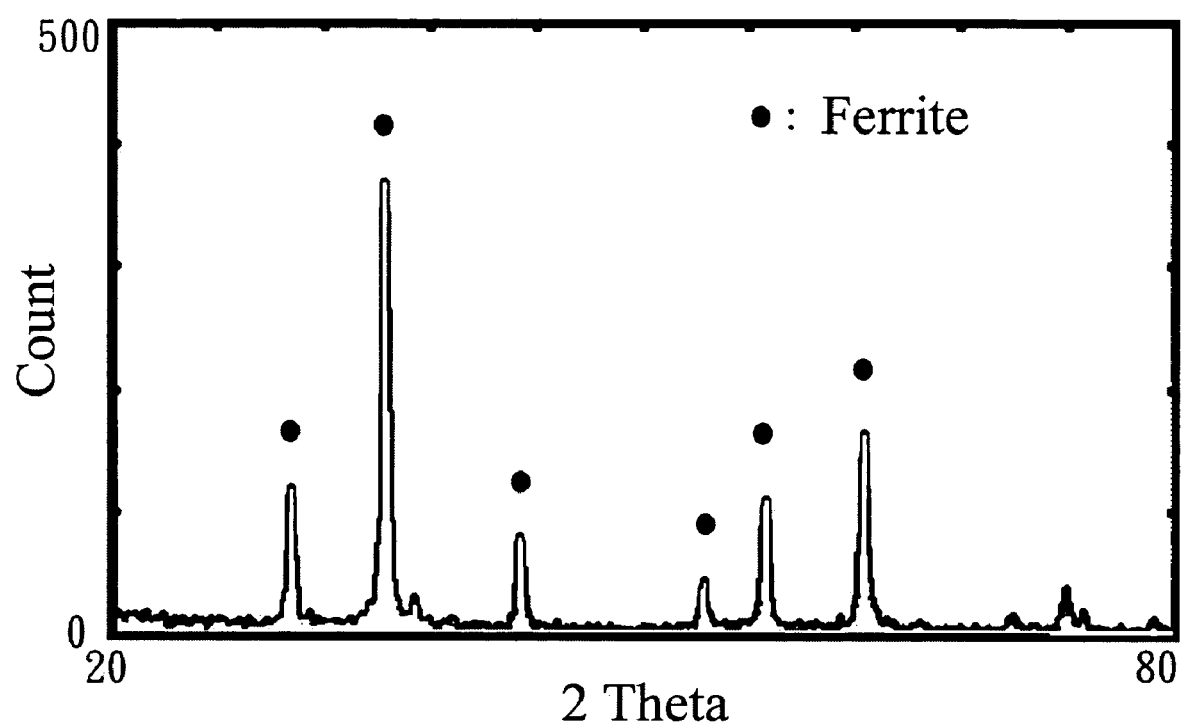

From the result of the analysis of water quality after treatment of fenton and ferrite processes as shown in Table 3, it is known that the removal efficiency of 1,2,3 benzotriazole (BTA) is 94.8%; the removal efficiency of total organic carbon (TOC) is 39.4%; the removal efficiency of Zn ions is 99.99%. From the result of the analysis of Fe ions concentration after treatment of fenton and ferrite processes as shown in Table 4, it is known that the iron sludge reduction is 99.99%. From the result of the analysis of the obtained products in solid phase as shown in Table 3, it is known that an amount of Zn ions in the toxicity characteristic leaching procedure (TCLP) is 10.94 ppm, showing the amount of TCLP is quite low. Moreover, from the X-ray diffraction (XRD) patterns of the ferrite products as shown in FIG. 6, it is confirmed that the solid products obtained in the integrated technology of the fenton and ferrite processes of the present invention are the ferrite products.

While the preferred embodiment of the invention has been described above, it will be recognized and understood that various modifications may be made therein and the appended claims are intended to cover all such modifications that may fall within the spirit and scope of the invention.

What is claimed is:

1. An integrated technology in sequential treatment of organics and heavy metal ions wastewater, comprising the steps of:

(1). initializing a fenton process by adding proper amount of ferrous salt and hydrogen peroxide ($H_2O_2$) into continuously mixing wastewater to adjust a molar ratio of organics:hydrogen peroxide ($H_2O_2$):ferrous ions ($Fe^{2+}$)) in a proper molar ratio, wherein reactive environment is controlled under conditions of temperature ranging from 20° C. to 100° C. and pH ranging from 2 to 5, and wherein a mixing rate is adjusted properly, and then monitoring variance of pH and oxidation-reduction potential (ORP) during said fenton process to determine a terminal time of said fenton process at which both pH and ORP reach a steady state;

(2). after said fenton process, further adding proper amount of ferrous salt to re-adjust the molar ratio of organics:hydrogen peroxide ($H_2O_2$):ferrous ions ($Fe^{2+}$) to control a molar ratio of ferrous ions ($Fe^{2+}$):heavy metal ions greater than 4;

(3). further heating the wastewater to a temperature ranging from 20° C. to 100° C., and adding proper amount of ferrous salt and alkali to adjust pH ranging from 8 to 12 for conducting a concentration for heavy metal ions;

(4). sequentially aerating air with a proper aerating rate to initialize a ferrite process, and then monitoring variance of pH and ORP during said ferrite process to determine a terminal time of said ferrite process at which both pH and ORP reach a steady state, by which ferrite products are capable of being formed therefrom;

(5). after said ferrite process, delivering slurry out of an outlet of a reactor tank and into a sedimentation tank for solid/liquid separation and filtration, by which solid sediment of said ferrite products being further examined with a toxicity characteristic leaching procedure (TCLP), and filtrate that is filtered and separated from said slurry being recirculated to the step (3) for reuse or directly drained away after an aqueous analysis and a pH adjustment; and, whereby the above steps sequentially treat said organics and said heavy metal ions contained in said wastewater by using said fenton process to reduce the effect of said organics on the magnetism of said ferrite products so as to enhance the quality of said ferrite products; Fe ions taken as catalysts in said fenton process are turned into a reactant in said ferrite process to solve a color problem of said wastewater caused by ferric ions ($Fe^{3+}$) and reduce iron sludge caused by coagulation after said fenton process.

2. The integrated technology in sequential treatment of organics and heavy metal ions wastewater as claimed in claim 1, wherein said molar ratio of organics:hydrogen peroxide ($H_2O_2$):ferrous ions ($Fe^{2+}$) in the step (1) is controlled to be 1:20~100:0.2~10.

3. The integrated technology in sequential treatment of organics and heavy metal ions wastewater as claimed in claim 1, wherein the molar ratio of organics:hydrogen peroxide ($H_2O_2$):ferrous ions ($Fe^{2+}$) in the step (2) is adjusted to be 1:20~100:30~150.

* * * * *